United States Patent [19]

Harada et al.

[11] Patent Number: 4,925,613
[45] Date of Patent: May 15, 1990

[54] PROCESS FOR PREPARATION OF SYNTHETIC FAUJASITE MOLDED BODY

[75] Inventors: Masashi Harada; Hiroshi Miyazaki, both of Shinnanyo, Japan

[73] Assignee: Toyo Soda Manufacturing Co., Ltd., Shinnanyo, Japan

[21] Appl. No.: 941,104

[22] Filed: Dec. 12, 1986

[30] Foreign Application Priority Data

Dec. 13, 1985 [JP] Japan .................. 60-279225

[51] Int. Cl.$^5$ .............................................. C04B 35/10
[52] U.S. Cl. ................... 264/232; 423/328; 423/118; 502/68; 502/79
[58] Field of Search ............... 264/232; 423/118, 328; 502/79, 68

[56] References Cited

U.S. PATENT DOCUMENTS 3,777,006  12/1973  Rundell ......................... 423/118
4,400,366   8/1983  Sanders ......................... 423/118

OTHER PUBLICATIONS

Derwent Abstract of Japanese Pub. 746/65.

Primary Examiner—James Derrington
Attorney, Agent, or Firm—Cushman, Darby & Cushman

[57] ABSTRACT

A synthetic faujasite molded body having high purity and high crystallinity is prepared with a good reproducibility by a process wherein a structure-inducing substance is incorporated in a starting material mixture comprising as main components a silica source, an alumina source, an alkali source and water; the mixture is kneaded and molded into a desired shape; and the molded body is heated in an aqueous solution of an alkali metal silicate or hydroxide. The structure-inducing material has a composition defined by the following oxide molar ratios:

$SiO_2/Al_2O_3 = 14$ to 60,
$M_2O/Al_2O_3 = 15$ to 40 and
$H_2O/M_2O = 12$ to 40 (M=alkali metal), and is prepared by mixing together an aqueous alkali metal silicate solution, an aqueous alkali metal aluminate solution and an aqueous alkali metal hydroxide solution to prepare a liquid phase substance having a composition defined by the following oxide molar ratios:

$SiO_2/Al_2O_3 = 8$ to 14,
$M_2O/Al_2O_3 = 7$ to 30, and
$H_2O/M_2O = 10$ to 14, aging the liquid phase substance at 20° to 60° C. for 10 minutes to 6 hours; and incorporating an aqueous alkali metal silicate solution into the aged liquid phase substance.

4 Claims, No Drawings

PROCESS FOR PREPARATION OF SYNTHETIC FAUJASITE MOLDED BODY

BACKGROUND OF THE INVENTION

(1) Field of the Invention

The present invention relates to a process for preparing a zeolite molded body which is valuable as a catalyst in purification of petroleum or petrochemical industry or as an agent for the separation or purification of gases and liquids. More particularly, the present invention provides a process for preparing a synthetic faujasite molded body without using a binder.

(2) Description of the Related Art

A faujasite type zeolite is a naturally occurring aluminosilicate, and this zeolite is also artificially synthesized by Linde Division of Union Carbide Corporation. The synthesized zeolite is named "Zeolite X" or "Zeolite Y" and is generally called synthetic faujasite. Various processes for the synthesis of synthetic faujasite have been proposed. But, most of these processes are directed to the preparation of a synthetic faujasite crystal powder.

Where synthetic faujasite is used industrially as an adsorbent or catalyst, it is often difficult to use synthetic faujasite directly in the form of crystal powder, and therefore, a molded body having a spherical shape, a columnar shape or other appropriate shape is ordinarily used.

Since, however, particles of zeolite crystal powder have no mutual bondability, an organic or inorganic binder is ordinarily used to impart appropriate plasticity and mechanical strengths during the preparation of a molded body. As the inorganic binder, there are used, for example, clay minerals such as kaolin and montmorillonite, and silica sol and alumina sol. However, although a certain mechanical strength is maintained in the thus-prepared molded body, the zeolite component is diluted by the added binder and the amount of the binder must be increased to impart a mechanical strength sufficient for industrial applications. If this molded body is used as a catalyst, the clay mineral incorporated as the binder sometimes causes an undesirable side reaction.

As the substitute for the process for preparing a molded body by mixing synthetic faujasite powder with a binder, several processes have been proposed in which a molded body of a starting material mixture is first prepared and the molded body is crystallized to form a synthetic faujasite molded body having substantially the same shape as the shape before crystallization. For example, there can be mentioned processes proposed in Japanese Examined Patent Publications Nos. 40-746 and No. 53-33,557. In these processes, as in the case where synthetic faujasite powder is prepared, a nucleus-forming seed having a size of 0.01 to 0.05 micron, which is obtained by aging a starting material composition at room temperature for a long time or by aging the composition at a low temperature, must be added to the starting material mixture.

We found that the incorporation of a transparent faujasite germ solution is very effective for the formation of crystal nuclei in the preparation of synthetic faujasite powder. However, when this finding was applied to the preparation of a synthetic faujasite molded body, it was found that crystallization is not sufficiently advanced and impurities are readily formed, and a desired synthetic faujasite molded body cannot be obtained. This is thought to be because the effect of the used transparent faujasite germ solution was lost during the kneading or molding step.

SUMMARY OF THE INVENTION

The present invention is intended to solve this problem. More specifically, it is a primary object of the present invention to provide a process for the preparation of a synthetic faujasite molded body in which a liquid phase substance, which is not deteriorated at the kneading or molding step, is prepared and made present in a starting material mixture, whereby a synthetic faujasite molded body having a high purity and high crystallinity can be prepared with a good reproducibility.

In accordance with the present invention, there is provided an improvement in a process for the preparation of a synthetic faujasite molded body, which comprises kneading a starting material mixture comprising as main components a silica source, an alumina source, an alkali source and water, molding the kneaded mixture into a desired shape (the obtained molded body is called "starting molded body"), and heating the molded body in an aqueous solution of an alkali metal silicate or an aqueous solution of an alkali metal hydroxide to form a synthetic faujasite molded body (the obtained molded body is called "crystallized molded body"). The improvement resides in that a structure-inducing substance is made present in the starting material mixture, which substance has a composition defined by the following oxide molar ratios:

$SiO_2/Al_2O_2 = 14$ to $60$,
$M_2O/Al_2O_3 = 15$ to $40$, and
$H_2O/M_2O = 12$ to $40$, wherein M is an alkali metal, and which-substance is prepared by mixing together an aqueous solution of an alkali metal silicate, an aqueous solution of an alkali metal aluminate and an aqueous solution of an alkali metal hydroxide to prepare a liquid phase substance having a composition defined by the following oxide molar ratios:

$SiO_2/Al_2O_3 = 8$ to $14$,
$M_2O/Al_2O_3 = 7$ to $30$, and
$H_2O/M_2O = 10$ to $14$, wherein M is as defined above; aging the liquid phase substance at a temperature of 20 to 60° C. for 10 minutes to 6 hours; and incorporating an aqueous solution of an alkali metal silicate into the aged liquid phase substance.

DESCRIPTION OF THE PREFERRED EMBODIMENTS

In preparing the structure-inducing substance, as the starting aqueous solution of the alkali metal silicate, solutions of sodium silicate, potassium silicate and lithium silicate are preferably used, and as the aqueous solution of the alkali metal aluminate, an aqueous solution of sodium aluminate is preferably used. Commercially available aqueous solutions of an alkali metal silicate and an alkali metal aluminate may be used. Furthermore, aqueous solutions formed by dissolving a silica source such as siliceous sand or hydrous solid silicic acid or an aluminum source such as active alumina in water by a caustic alkali may be used. An aqueous solution of sodium hydroxide is most preferred as the aqueous solution of the alkali metal hydroxide.

In preparing the structure-inducing substance, the order of addition of the starting aqueous solutions is not particularly critical, but it is generally preferred that the aqueous solution of the alkali metal hydroxide and the aqueous solution of the alkali metal aluminate be mixed in advance, the aqueous solution of the alkali metal silicate be added in as short a time as possible, the mixture be aged, and the aqueous solution of the alkali metal silicate then further added.

Aging is carried out at a temperature of 20° to 60° C., preferably 25° to 50° C., for 10 minutes to 6 hours, preferably 20 minutes to 4 hours, with stirring. If the aging degree determined by the temperature and time within the above-mentioned ranges of the aging temperature and time is insufficient, the intended structure-inducing substance is not formed, and if the aging degree is excessively increased, a gelatinous substance is formed to cause the formation of impurities.

After completion of the aging, the additional aqueous solution of the alkali metal silicate is immediately added to the aged mixture.

The thus-obtained structure-inducing substance is a transparent liquid substance, and the transmittance determined by the transmitted light measuring method is at least 80% to distilled water. The structure-inducing substance is very stable and the effect is not lost even if the substance is allowed to stand at room temperature for a long time.

The starting materials of the starting material mixture other than the structure-inducing substance are not particularly critical, but preferably a silica source, alumina source or alkali source having a relatively high reactivity is used. It is sufficient if the molar ratios of the respective components are as follows:

$SiO_2/Al_2O_3 = 2$ to 10, preferably 2.5 to 8,
$Na_2O/Al_2O_3 = 0.5$ to 5, preferably 0.5 to 2, and
$H_2O/Al_2O_3 = 5$ to 55.

As the silica source, there can be used amorphous silica, silica sol, sodium silicate and naturally occurring diatomaceous earth and silicate minerals. When a natural substance is used, preferably the natural substance is used after impurities not preferred for the production of zeolites have been removed. As the alumina source, there can be mentioned aluminum hydroxide, aluminum oxide, sodium aluminate, aluminum sulfate, aluminum nitrate and naturally occurring aluminosilicate minerals such as kaolinite and halloysite. When kaolinite is used, preferably a product obtained by calcining kaolinite at a temperature of 550° to 800° C. to increase the reactivity, that is, metakaolin, is used. The above-mentioned sodium silicate and sodium aluminate act also as the alkali source. Caustic soda also can be used as the alkali source.

The structure-inducing substance prepared in advance is mixed with the above-mentioned silica source, alumina source, alkali source and water, and the mixture is kneaded and molded into a desired shape. The amount of the structure-inducing substance present in the starting material mixture is such that the amount of $Al_2O_3$ present in the structure-inducing substance is 1 to 30% by weight, preferably 1 to 20% by weight, based on the total weight of $Al_2O_3$ present in the starting material mixture. If the amount is smaller than 1% by weight, impurities are readily formed at the crystallizing step, and if the amount is too large, the effect is not proportionally increased.

The method for mixing and kneading the starting materials is not particularly critical. However, where metakaolin is used as the alumina source other than the alumina source in the structure-inducing substance, only gelation occurring when the structure-inducing substance is mixed with metakaolin is effectively utilized for increasing the moldability of the starting material mixture. More specifically, where the $SiO_2/M_2O$ molar ratio in the structure-inducing substance is low, especially where M is a sodium cation and the $SiO_2/Na_2O$ molar ratio is in the range of from 0.5 to 2.0, preferably from 0.8 to 1.8, if the structure-inducing substance is mixed with metakaolin to form a slurry, the viscosity of the slurry is increased with the lapse of time. The viscosity of the slurry and the change of the viscosity can be controlled by the $SiO_2/Na_2O$ molar ratio in the structure-inducing substance, the slurry-mixing temperature and time and the solid concentration in the slurry. If the slurry is mixed and kneaded with other starting materials while the viscosity is in the range of from 5,000 to 50,000 cP, the viscosity and plasticity of the starting material mixture are increased and the moldability is improved.

Furthermore, in order to improve the moldability of the starting material mixture, a molding assistant or lubricant may be added, so long as crystallization of the synthetic faujasite molded body is not inhibited. As the molding assistant or lubricant, there can be mentioned, for example, carboxymethylcellulose, stearic acid, alcohols, surface active agents and fibers.

An extruder type molding machine, a tableting molding machine and a rotary molding machine may be used according to the required shape of the molded body.

The starting molded body is cured or dried by allowing it to stand at a temperature of 15° to 100° C. for 5 minutes to 7 days, and the molded body is crystallized in an aqueous solution of an alkali metal silicate or an aqueous solution of an alkali metal hydroxide. The composition of the total reaction mixture is adjusted to one of a known synthetic faujasite powder, for example, within a range defined by the following oxide molar ratios:

$SiO_2/Al_2O_3 = 2.5$ to 20,
$Na_2O/Al_2O_3 = 1.5$ to 30, and
$H_2O/Al_2O_3 = 20$ to 40.

The crystallization is carried out at 75° to 130° C. as in the conventional processes. The time required for the crystallization depends on the temperature, but ordinarily is 10 to 40 hours.

After completion of the crystallization, the crystallized molded body is separated from the crystallizing solution and the excessive alkali component adhering to the crystallized molded body is removed by washing, and the crystallized molded body is then dried, whereby a synthetic faujasite molded body can be easily obtained.

As is apparent from the foregoing description, according to the present invention, by using the structure-inducing substance, a synthetic faujasite molded body having a high purity and high crystallinity can be prepared with a good reproducibility. Furthermore, a special apparatus need not be used for preparing the structure-inducing substance, and even if the prepared structure-inducing substance is allowed to stand at room temperature, it is not deteriorated, and therefore, the structure-inducing substance can be handled very easily.

The synthetic faujasite molded body according to the process of the present invention adsorbs a sufficient amount of water and has a mechanical strength sufficient to endure industrial application. Accordingly, the molded body can be directly used as an adsorbent or ion exchanger, and after it has been subjected to a catalyzing treatment, it can be used as a solid acid catalyst for various reactions.

The present invention will now be described in detail with reference to the following examples.

EXAMPLE 1

In 305.6 g of pure water was dissolved 172.6 g of sodium hydroxide (NaOH=98% by weight), and the solution was cooled to 30° C. The, 104.3 g of an aqueous solution of sodium aluminate ($Al_2O_3$=19.6% by weight, $Na_2O$=19.0% by weight) was added to the solution and they were sufficiently mixed.

Then, 417.5 g of an aqueous solution of sodium silicate ($SiO_2$=28.9% by weight, $Na_2O$=9.4% by weight) was added to the mixture, and the resulting mixture was aged at an ambient temperature of 30° C. with stirring for 3 hours.

After termination of the aging, 1,000 g of an aqueous solution of sodium silicate ($SiO_2$=28.9% by weight, $Na_2O$=9.4% by weight) was immediately added, and the mixture was sufficiently stirred until a homogeneous solution was formed, whereby a structure-inducing substance was obtained.

The structure-inducing substance was characterized by the following oxide molar ratios:
$SiO_2Al_2O_3$=34.0,
$Na_2O/Al_2O_3$=22.9, and
$H_2O/Na_2O$=15.6.

The compositions of metakaolin and diatomaceous earth used in this example are shown in Table 1.

TABLE

| | (unit: % by weight) | | | |
|---|---|---|---|---|
| | $Na_2O$ | $Al_2O_3$ | $SiO_2$ | $H_2O$ |
| Metakaolin | 0.059 | 44.1 | 53.80 | 1.25 |
| Diatomaceous earth | 0.22 | 3.18 | 83.70 | 10.80 |

A mixture of 262 g of the structure-inducing substance and 125 g of metakaolin was stirred at 40° C. for 60 minutes. At this point, the viscosity of the slurry was 30,000 cP. Then, 114 g of diatomaceous earth was added to the slurry, and the mixture was molded into columns having an outer diameter of 1.5 mm by a molding machine.

The starting molded body was placed in a sealed vessel and was cured by allowing it to stand at room temperature overnight. Then, 42.8 g of the starting molded body and 57.2 g of an aqueous solution of sodium silicate ($SiO_2$=8.1% by weight, $Na_2O$=10.1% by weight) were charged in a pressure-resistant test tube, the tube was sealed and the mixture was crystallized at 95° C. for 20 hours.

After termination of the crystallization, the crystallized molded body was sufficiently washed with warm water at 60° C. and was dried at 110° C. The crystallization degree was measured by powder X-ray diffractometry. As the result, it was found that the obtained crystallized molded body was a synthetic faujasite molded body free of impurities and having a crystallization degree of 92%.

EXAMPLE 2

A structure-inducing substance was prepared in the same manner as described in Example 1 except that the amount of the aqueous solution of sodium silicate added after aging was changed to 1,741 g. This structure-inducing substance was characterized by the following oxide molar ratios:

$SiO_2/Al_2O_3$=51.7,
$Na_2O/Al_2O_3$=28.3, and
$H_2O/Na_2O$=16.9.

A mixture of 280 g of this structure-inducing substance and 124 g of metakaolin was stirred at 40° C. for 120 minutes. At this point, the viscosity of the formed slurry was 20,000 cP. To the slurry were added 96 g of diatomaceous earth, 9.3 g of carboxymethylcellulose and 1.5 g of crystalline cellulose, and the mixture was kneaded and molded into spheres having a diameter of 2 to 4 mm by a molding machine. The starting molded body was placed in a sealed vessel and allowed to stand at room temperature for 2 days. Then, 220 g of the starting molded body and 280 g of an aqueous solution of sodium silicate ($SiO_2$=8.3% by weight, $Na_2O$=10.3% by weight) were charged in a pressure-resistant test tube and crystallization was effected at 95° C. for 20 hours. The crystallized molded body was sufficiently washed with warm water at 60° C. and dried at 110° C. The obtained crystallized molded body was a synthetic faujasite molded body free of impurities and having a crystallization degree of 90%.

EXAMPLE 3

A structure-inducing substance was prepared in the same manner as described in Example 1 except that the amount of the aqueous solution of sodium silicate added after aging was changed to 1,323 g.

The structure-inducing substance was characterized by the following oxide molar ratios:
$SiO_2/Al_2O_3$=41.7,
$Na_2O/Al_2O_3$=25.3, and
$H_2O/Na_2O$=16.2.

A mixture of 295 g of the structure-inducing substance, 139 g of metakaolin, 9.1 g of carboxymethylcellulose and 1.5 g of crystalline cellulose was stirred at 40° C. for 70 minutes. At this point, the viscosity of the slurry was 30,000 cP. To the slurry was added 66 g of diatomaceous earth, and the mixture was kneaded and molded into columns having an outer diameter of 1.8 mm by a molding machine. The obtained starting molded body was placed in a sealed vessel and allowed to stand at room temperature overnight. Then, 214 g of the starting molded body and 286 g of an aqueous solution of sodium silicate ($SiO_2$=11.6% by weight, $Na_2O$=8.7% by weight) were charged in a pressure-resistant test tube, the tube was sealed, and crystallization was effected at 95° C. for 20 hours. The crystallized molded body was sufficiently washed with warm water at 60° C. and dried at 110° C. The obtained crystallized molded body was a synthetic faujasite molded body free of impurities and having a crystallization degree of 95%.

COMPARATIVE EXAMPLE 1

A starting molded body was prepared in the same manner as described in Example 1 except that 124.6 g of metakaolin, 113.8 g of diatomaceous earth, 13.6 g of an aqueous solution of sodium aluminate ($Al_2O_3$=19.6% by weight, $Na_2O$=19.0% by weight), 185 g of an aqueous solution of sodium silicate ($SiO_2$=28.9% by weight, $Na_2O$=9.4% by weight), 22.5 g of sodium hydroxide (NaOH=98% by weight) and 40.4 g of water were mixed at one time and kneaded and the kneaded mixture was molded into columns having an outer diameter of 3 mm.

When the crystallized molded body was analyzed by powder X-ray diffractometry, it was found that the obtained molded body contained gmelinite as an impurity and the crystallization degree of the faujasite was 23%.

COMPARATIVE EXAMPLE 2

In 30.6 g of pure water was incorporated and dissolved 17.3 g of sodium hydroxide (NaOH=98% by weight), and the solution was cooled to 30° C., and 10.4 g of an aqueous solution of sodium aluminate (Al$_2$O$_3$=19.6% by weight, Na$_2$O=19.0% by weight) was added to the solution. The mixture was sufficiently stirred and 41.8 g of an aqueous solution of sodium silicate (SiO$_2$=28.9% by weight, Na$_2$O=9.4% by weight) was added, and the mixture was aged at an ambient temperature of 30° C. for 3 hours with stirring, whereby a liquid phase substance was obtained. Then, 39.1 g of the liquid phase substance was mixed with 24.1 g of metakaolin, 30.6 g of diatomaceous earth, and 21.8 g of pure water, and the mixture was kneaded and molded into columns having an outer diameter of 3 mm. The obtained starting molded body was placed in a sealed vessel and allowed to stand at room temperature overnight. Then, 24.6 g of the starting molded body and 28.8 g of an aqueous solution of sodium silicate (SiO$_2$=8.0% by weight, Na$_2$O=10.0% by weight) were charged in a pressure-resistant test tube, the test tube was sealed, and crystallization was effected at 95° C. for 20 hours. The obtained crystallized molded body as a synthetic faujasite molded body containing gmelinite as an impurity and having a crystallization degree of 76%.

We claim:

1. A process for the preparation of a synthetic faujasite molded body, which comprises:
(a) preparing a structure-inducing substance, which substance has a composition defined by the following oxide molar ratios:
SiO$_2$/Al$_2$O$_2$=14 to 60,
M$_2$O/Al$_2$O$_3$=15 to 40, and
H$_2$O/M$_2$O=12 to 40,
wherein M is an alkali metal,
and which substance is prepared by:
(1) mixing together an aqueous solution of an alkali metal silicate, an aqueous solution of an alkali metal aluminate and an aqueous solution of an alkali metal hydroxide to prepare a liquid phase substance having a composition defined by the following oxide molar ratios:
SiO$_2$/Al$_2$O$_3$=8 to 14,
M$_2$O/Al$_2$O$_3$=7 to 30, and
H$_2$O/M$_2$O=10 to 14,
wherein M is as defined above;
(2) aging the liquid phase substance at a temperature of 20° to 60° C. for 10 minutes to 6 hours; and
(3) incorporating an aqueous solution of an alkali metal silicate into the aged liquid phase substance to obtain the structure-inducing substance;
(b) mixing the structure-inducing substance with a starting material mixture comprising as the main components a silica source, an alumina source, an alkali source and water in such a manner that the amount of Al$_2$O$_3$ present in the structure-inducing substance is 1 to 30% by weight based on the total weight of Al$_2$O$_3$ present in the starting material mixture;
(c) kneading the starting material mixture and the structure-inducing substance;
(d) molding the kneaded mixture into a desired shape; and
(e) heating the molded body in an aqueous solution of an alkali metal silicate or an aqueous solution of an alkali metal hydroxide to form a synthetic faujasite molded body.

2. A process according to claim 1, wherein M is Na, the structure-inducing substance having an SiO$_2$/Na$_2$O molar ratio of from 0.5 to 2.0 is mixed with metakaolin to form a slurry, and when the vicosity of the slurry becomes 5,000 to 50,000 cP, the other starting materials are to the slurry to form the starting material mixture.

3. A process according to claim 2 and 1, wherein a starting material mixture in which M is Na is kneaded and molded into a desired shape, the molded body ia allowed to stand at 15° to 100° C. for 5 minutes to 7 days, and the molded body is crystallized in an aqueous solution of sodium silicate or an aqueous solution of sodium hydroxide under conditions such that
(a) the composition of the system comprising the molded body and the aqueous solution is defined by the following oxide molar ratios:
SiO$_2$/Al$_2$O$_3$=2.5 to 20,
Na$_2$O/Al$_2$O$_3$=1.5 to 30, and
H$_2$O/Al$_2$O$_3$=20 to 40,
(b) the crystallization temperature is 75° to 130° C., and
(c) the crystallized time is 10 to 40 hours.

4. A process according to claim 1, wherein the structure-inducing substance is mixed with the starting material mixture in such a manner that the amount Al$_2$O$_3$ present in the structure-inducing substance is 1 to 20% by weight based on the total weight of Al$_2$O$_3$ present in the starting material mixture.

* * * * *